(12) United States Patent
Emerson et al.

(10) Patent No.: US 10,766,554 B1
(45) Date of Patent: *Sep. 8, 2020

(54) COMPACT, WATERPROOF RECHARGEABLE LIGHT ASSEMBLY

(71) Applicant: Light & Motion Industries, Marina, CA (US)

(72) Inventors: Daniel T. Emerson, Carmel, CA (US); Jarod Armer, Aromas, CA (US); David William Tolan, Carmel, CA (US); Brooks Patrick Lame, Seaside, CA (US)

(73) Assignee: Light & Motion Industries, Marina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,566

(22) Filed: Jul. 20, 2018

Related U.S. Application Data

(63) Continuation-in-part of application No. 15/331,543, filed on Oct. 21, 2016, now Pat. No. 10,131,392.

(51) Int. Cl.
| | | |
|---|---|---|
| *B62J 3/00* | (2020.01) | |
| *B62J 6/04* | (2020.01) | |
| *F21V 21/088* | (2006.01) | |
| *B62J 6/01* | (2020.01) | |
| *F21Y 115/10* | (2016.01) | |

(52) U.S. Cl.
CPC . *B62J 6/04* (2013.01); *B62J 6/01* (2020.02); *F21V 21/0885* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 8,770,808 B1 * | 7/2014 | Campbell | B62J 6/04 362/473 |
| 9,113,504 B1 * | 8/2015 | Hamasaki | H05B 37/02 |
| 9,322,520 B1 * | 4/2016 | Li | G02B 6/0011 |
| 9,568,171 B1 * | 2/2017 | Grider | F21V 21/0965 |
| 2011/0148611 A1 * | 6/2011 | Ni | B62J 6/04 340/432 |

(Continued)

OTHER PUBLICATIONS

Lezyne, description and views of Lezyne Hecto Drive 350XL USB style light, print from Lezyne.com website, copyright 2016, Lezyne, 4 pages.

(Continued)

*Primary Examiner* — Julie B Lieu
(74) *Attorney, Agent, or Firm* — Thomas M. Freiburger

(57) ABSTRACT

A bicycle light has in one embodiment a mounting base to connect to the bicycle, and an LED light unit for insertion into and removal from the base. The light unit includes a printed circuit board with LED driver and a rechargeable battery, all of which are encapsulated by a direct overmolding that forms a casing for the unit. For charging the light unit is pulled out from the base and plugged into a USB port via an extending USB blade. A motion detector on the PCB shuts off the LED if no motion is detected for several minutes, thus eliminating need for any exterior switch. Another embodiment is without the USB blade, with the battery charged by inductive charging.

13 Claims, 16 Drawing Sheets

(56) References Cited

U.S. PATENT DOCUMENTS

| | | | | |
|---|---|---|---|---|
| 2012/0182748 A1* | 7/2012 | McCaslin | .............. | A42B 3/044 |
| | | | | 362/473 |
| 2013/0141933 A1* | 6/2013 | Leonardo | ................... | B62J 6/02 |
| | | | | 362/523 |
| 2013/0301285 A1* | 11/2013 | McCaslin | ................ | B62J 6/003 |
| | | | | 362/473 |
| 2013/0307678 A1* | 11/2013 | Ransom | ................... | B62J 6/005 |
| | | | | 340/432 |
| 2015/0023034 A1* | 1/2015 | Zhang | ...................... | B62J 6/001 |
| | | | | 362/473 |
| 2016/0001837 A1* | 1/2016 | Wan | ......................... | B62J 6/005 |
| | | | | 362/474 |
| 2016/0069523 A1* | 3/2016 | Chien | .................... | H05B 33/08 |
| | | | | 362/97.1 |
| 2016/0083033 A1* | 3/2016 | Liu | ......................... | B62J 6/003 |
| | | | | 362/474 |
| 2016/0257366 A1* | 9/2016 | Lee | ......................... | B62J 6/005 |
| 2016/0339978 A1* | 11/2016 | Braucht | .................... | B62J 3/00 |
| 2017/0203802 A1* | 7/2017 | Zhao | ...................... | F21V 29/89 |
| 2018/0369064 A1* | 12/2018 | Baxter | ..................... | A61F 7/10 |

OTHER PUBLICATIONS

Description and views of Specialized Stix Reflector Mount USB style light, print from Specialized.com website, copyright 2016, Specialized Bicycle Components, 2 pages.

\* cited by examiner

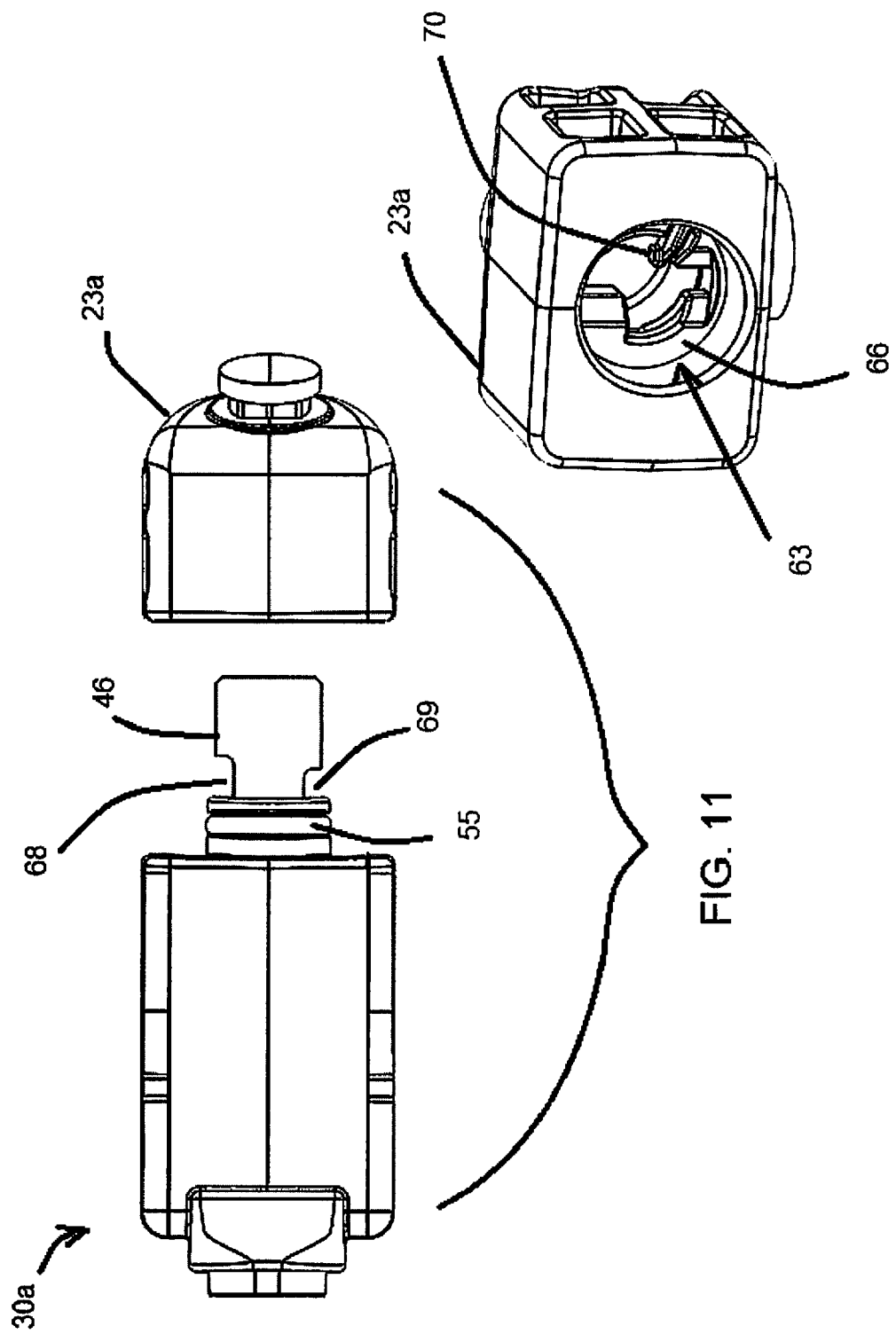

COMPACT, WATERPROOF RECHARGEABLE LIGHT ASSEMBLY

This application is a continuation-in-part of application Ser. No. 15/331,543, filed Oct. 21, 2016, now U.S. Pat. No. 10,131,392, issued Nov. 20, 2018.

BACKGROUND OF THE INVENTION

The invention concerns LED lighting, such as for bicycle lights or other rechargeable lights which may be carried, worn on the body, attached to equipment or stationary. Specifically the invention is concerned with an LED light in a compact and waterproof enclosure that can be quite small, may be without an external switch, and can project various wavelengths of light.

A large number of different rechargeable bicycle lights and other LED lights have been known, many of them currently marketed. In at least one case a bicycle light had a USB connection blade at rear, the light assembly being contained within an injection-molded casing to be mounted to the bicycle handlebar, seat post or other structure. A back end of the light, separate from the mount, could be removed from the main part of the light's casing to expose a USB contact blade. In order to recharge the battery of the light assembly using the USB connection, the light had to be removed from the bicycle and plugged into a suitable USB port, or a USB extension cord could be brought to the light. With such an assembly the entire casing unit must be waterproof for preventing moisture damage to the LED, circuit board and battery. This can be a cumbersome issue with multiple casing components and an external switch on the casing. Another problem with the construction was that it might not always be possible to recharge the battery, particularly using the USB port, because of the bulky nature of the case which can interfere with access to a typical USB port on a laptop or other convenient USB docking station. This is along with the difficulty of creating a waterproof seal around an exposed USB blade, which is a flat, thin member with exposed contacts. Even if the bicycle mounting bracket or strap were removed so that the entire case could be brought to a computer, it has not always been possible to plug the USB connection into the computer.

In typical current implementations of lights with USB blades allowing for direct plug in and charging of the light, the rigid USB blade or stick used for charging is independent of the mounting apparatus and requires a separate cover to seal the exposed USB blades during use. This makes the light larger and requires extra parts that can be lost and extra steps required to charge the light. In one existing bike light the extending USB plug-in blade was inserted into a slot of a bike-mounted base, with the slot extending entirely through the base such that the outer end of the USB blade was exposed. A cap was provided to cover the end of the blade, also to retain the light unit to the base.

Many other forms of LED lights, some rechargeable, have been marketed, typically in pre-molded housings into which components are assembled. Often recharging is cumbersome. Accordingly, there has been a need for a light assembly, for a wide variety of applications, that is reliably waterproof, simple and economic in construction, capable of small size and conveniently recharged.

SUMMARY OF THE INVENTION

In one embodiment a new light of the invention, which can be used on bicycles and on other applications, has a USB connector at one end, which serves as a mounting bracket for the light when on a bicycle or other implement. However, when it is pulled out of the base unit that is secured to the bike at a handlebar or seat post or other frame member or accessory such as a luggage rack, it can be plugged into any charger for a smartphone or into a USB port of a computer or other device.

The extending USB blade in this embodiment is part of a contiguous circuit board that houses all the related electronics required to drive the LED. This makes the design very cost effective.

The light device of the invention, except the USB blade, is encapsulated in a type of plastic casing called low-pressure molding or low-pressure molded plastic, using hot-melt plastics. Its temperatures also are low (about 410° F. for polyamide, for example) compared to conventional plastics, so it is possible to directly inject the material over a circuit board and even the battery and the LED in order to completely encapsulate the circuit board and battery system and form a compact, integral housing directly over the components. Pressure in the overmold cavity is low, typically about 50-200 psi. This method allows for a very simple, cost effective and waterproof enclosure compared with an equivalent molded enclosure design with housing, multiple parts, seals and assembly. It also allows the finished product to be smaller in volume than equivalent designs assembled into a case. This can be for a tail light and also for a front bike light, and is well-adapted for many other uses. Low pressure molding has been used previously to encapsulate electronics but not to form a light unit as in this invention.

One feature of this embodiment is that the USB as a bracket, when plugged in, will have a switch on one or both sides alongside, that will allow the unit to be powered by its own battery. Thus, once the USB is pulled out of the mounting device, the light cannot be powered. Also, the unit preferably will have, also encased in the plastic, a motion detector switch, i.e. a unit that detects its own motion. The light will stay on for several minutes after motion ceases. That way, a person can simply park the bike (or stop active use of the light in another context) and the light will go off within a short time.

The design uses the exposed blade to secure the light into the mounting bracket or base which receives and holds the "tongue" including the blade and seals the exposed contacts from the environment. The overmolded material preferably creates a round barrel with a recess for an O-ring that seals against the mount or base when inserted. When the blade is inserted into the base, a spring switch or alternatively a capacitance switch is operated that switches power to the LED light circuit, allowing it to be controlled either by a manual switch activated by the user, or more preferably as noted above, by a motion sensor embedded in the circuit board that turns on the LED when motion of the light unit is sensed. With the motion sensor in the circuit all the user needs to do is insert the light in the mount and ride. The light will turn on when the bike is moving and will shut off when no motion is detected after a set period of time, e.g. 2-3 minutes, as programmed into the LED circuit. Additionally the embedded motion detector eliminates the need for any user accessible switch, further simplifying the design while adding user convenience, and better facilitating waterproofing.

The light unit and the base can be latched together in any of several different ways. A preferred latch device is a co-action between the USB blade and the base unit, whereby the USB blade is pushed into the base unit, then turned ¼ turn to lock the light unit in place.

In one embodiment the switch on the light body is a momentary switch, so the pressure on the switch will turn it on when the unit is put in place. However, there are other options. One could have a magnet in the case on the bicycle, and a detector in the portable light unit that allows it to turn on when the magnet is nearby; another option is a capacitance switch, operated when the light body tongue is fully pushed in, or pushed in and turned. A still further alternative for the main switch is to have a metal bar in the socket of the base unit on the bike, positioned to short out two contacts on the USB blade, completing a circuit. A further alternative is a spring ball/detent which will act to help hold the USB in place, and also to short out two contacts at the detent, completing the circuit.

In any case one preferred design uses two switches. One switch connects power to the light unit automatically when it is inserted in the base or mount, but does not turn the light itself on. The second switch is a motion detector that turns the light on when motion of the unit is sensed. The advantage of this system is the user never needs to engage a switch and no switch is needed on the exterior. When the bike is parked the light remains off. When the light senses motion the light will turn on with no need for user input. In the case of a front light, a photodetector is also included so that the light does not operate in normal mode (although it may flash) in daylight. When the device is removed from the mount the light unit cannot be turned on.

The battery is flat, preferably a lithium polymer battery. It may have a capacity in the range of about 250 milliamp-hours to 1200-milliamp hours depending on the power of light head desired. A preferred embodiment has an approximately 550 MA-hour battery that allows a tail light to run at 25 lumens for four to five hours, or a head lamp to run at 200 lumens for about one hour (or at lower power for a longer period).

As noted above, the new light is waterproof, i.e. the entire light unit that removes from the base unit on the bike is waterproof. This is due to the low-pressure molded encapsulation.

With the light device of the invention, the unique manufacturing technique employed to over-mold the electronics directly with the battery, and preferably the LED, allows for a very simple and cost effective manufacturing process with minimal tooling and no assembly into a housing. A comparable conventionally manufactured light would require two complete injection molds to create two sides of a clamshell to house the battery and electronics, a molded gasket, fasteners, and some provision to hold the battery and electronics from moving inside the housing, as well as seals around exposed charging contacts. Additionally, the low-pressure molding materials are available in optically clear formulations which allow LEDs to be surface-mounted on the circuit board, to directly illuminate through the clear encapsulation, thereby further simplifying the part count and sealing of the light source. Thus, the LED or LEDs preferably are encapsulated in the overmold as part of the circuit.

Side lights can be present in the encapsulated design to emit amber light directly to the sides, which can be useful for bicycle lights. The optically clear overmolded material allows the side lights to shine through the encapsulation without the need for additional lensing. A rear facing red light or front facing white LED can optionally include a lens element for focusing the light. The lens element is installed directly over the LED and attached to the circuit board as in conventional LED bike lights. The overmolded material is injected around the lens or optic (if included) creating a seal and holding the optic in place. A molded optical element embedded in the molding compound is directly sealed against the LED. This style of construction is preferred when a more controlled beam pattern is desired such as when used for a headlight or any other spot beam.

The light of the invention is also useful as an underwater diving light, with its reliable waterproofing and compact configuration, as well as for many other types of lights, especially where the casing should be waterproof, or small and compact. Battery charging can be via exposed contacts (or a USB blade) extending out of the overmold, or more preferably the circuit within the overmold can include provision for inductive charging, so that nothing penetrates through the overmold casing. The small, sealed light unit has many applications, including on a biker's shoes or a runner's shoes, on drones, on hand tools, on pet collars, etc. and can produce infrared light for special applications, if desired.

It is an object of the invention to provide a compact light device that is simple and inexpensive in construction, reliably waterproof and conveniently used, especially in recharging. These and other objects, advantages and features of the invention will be apparent from the following description of a preferred embodiment, considered along with the accompanying drawings.

DESCRIPTION OF THE DRAWINGS

FIG. 11 is an exploded plan view showing the two components, the main light body unit and the base or leg mount, for assembly, and showing a USB column extending back from the light body unit.

FIG. 12 is a perspective view showing the mounting base.

DESCRIPTION OF PREFERRED EMBODIMENTS

Figure 1A:
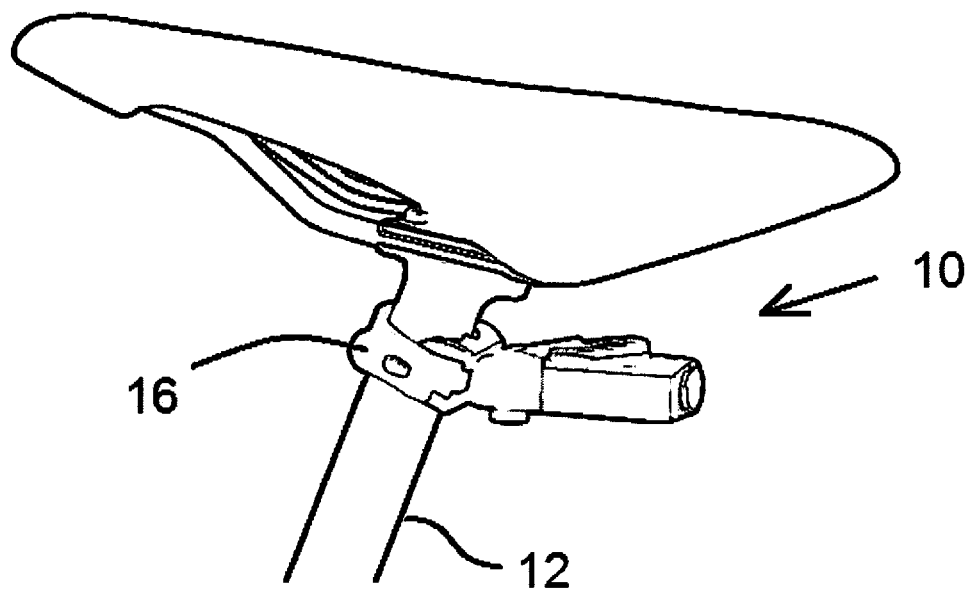
FIGS. 1A and 1B are perspective views showing a bicycle light of the invention attached on a seat post and on a handlebar, respectively.
Figure 1B:
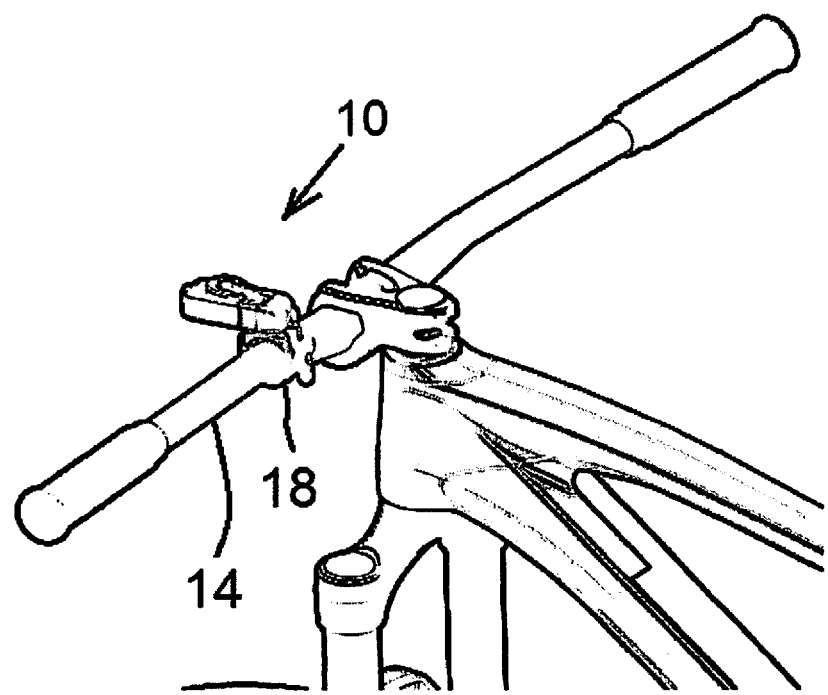

FIGS. 1A and 1B show the bicycle light assembly 10 of the invention attached to a bicycle, i.e. to a bicycle seat post 12 and to a handlebar 14, respectively. These connections to the bike can be made using connectors such as on Light & Motion Industries Urban bicycle light mountings, which can be seen at lightandmotion.com. As the drawings illustrate, mounting brackets 16 and 18 (preferably with stretchable bands as shown) are secured to the seat post or to the handlebar, and these mounting brackets, as on the Urban bicycle light, have a slot (not shown) onto which the light assembly 10 slides to firmly retain it in place. However, other types of connection could be used.

Figure 2:
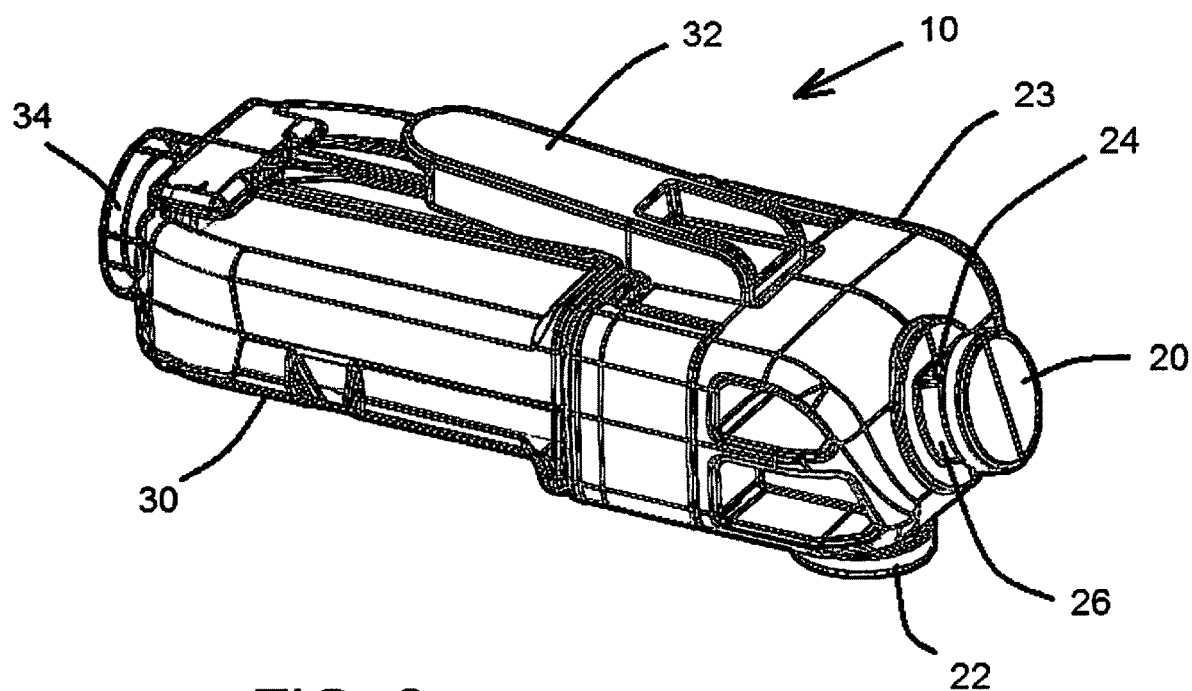
FIG. 2 is a perspective view showing the light assembly, including a base that becomes mounted to the bicycle.

FIG. 2 shows the light assembly 10 without connection to any bicycle bracket. FIG. 2 shows button mounts or "mushroom" mounts 20 and 22 at different orientations on a base portion 23 of the light assembly. These are oriented and configured to be received in slots on the bike bracket, e.g. for handlebar or seat post mounting; plastic engages plastic and a stable connection is made. FIG. 2 shows that the button mount 20 has opposed flats 24 on a stem 26, to hold the light unit in proper orientation on the bike. The lower button mount 22 is without flats because of the need for aiming of the light on many handlebars.

In a variation, the base 23 has a mounting band (not shown, similar to the stretchable mounting bands 16, 18 shown in FIGS. 1A and 1B) attached directly to the base, or permanently affixed thereto, eliminating the button mounts 20, 22. The orientation of the band is in accordance with the light's function as a head light or a tail light, and the base 23 preferably has a concave surface (as do the brackets 16, 18 in FIGS. 1A and 1B) approximately shaped and oriented to engage with either a handlebar or a seat post. Thus, the mounting bracket is built into the base portion 23.

As explained above, the light assembly 10 is in two components, a main LED light body 30 containing LED and electronics, and the base part 23, from which the main body 30 is separable. The base, as explained above, can include the bicycle mounting device if desired, thus involving fewer components. The main LED unit 30 assembles into the base portion 23. In one embodiment a pivoted lever latch 32 is provided to latch the two in the assembled configuration shown. In FIG. 2 the drawing shows a light projecting end 34, which can be an optic for the beam, on the main unit 30. This can be a tail light or a head light for the bike, as indicated in FIGS. 1A and 1B.

Figure 6:
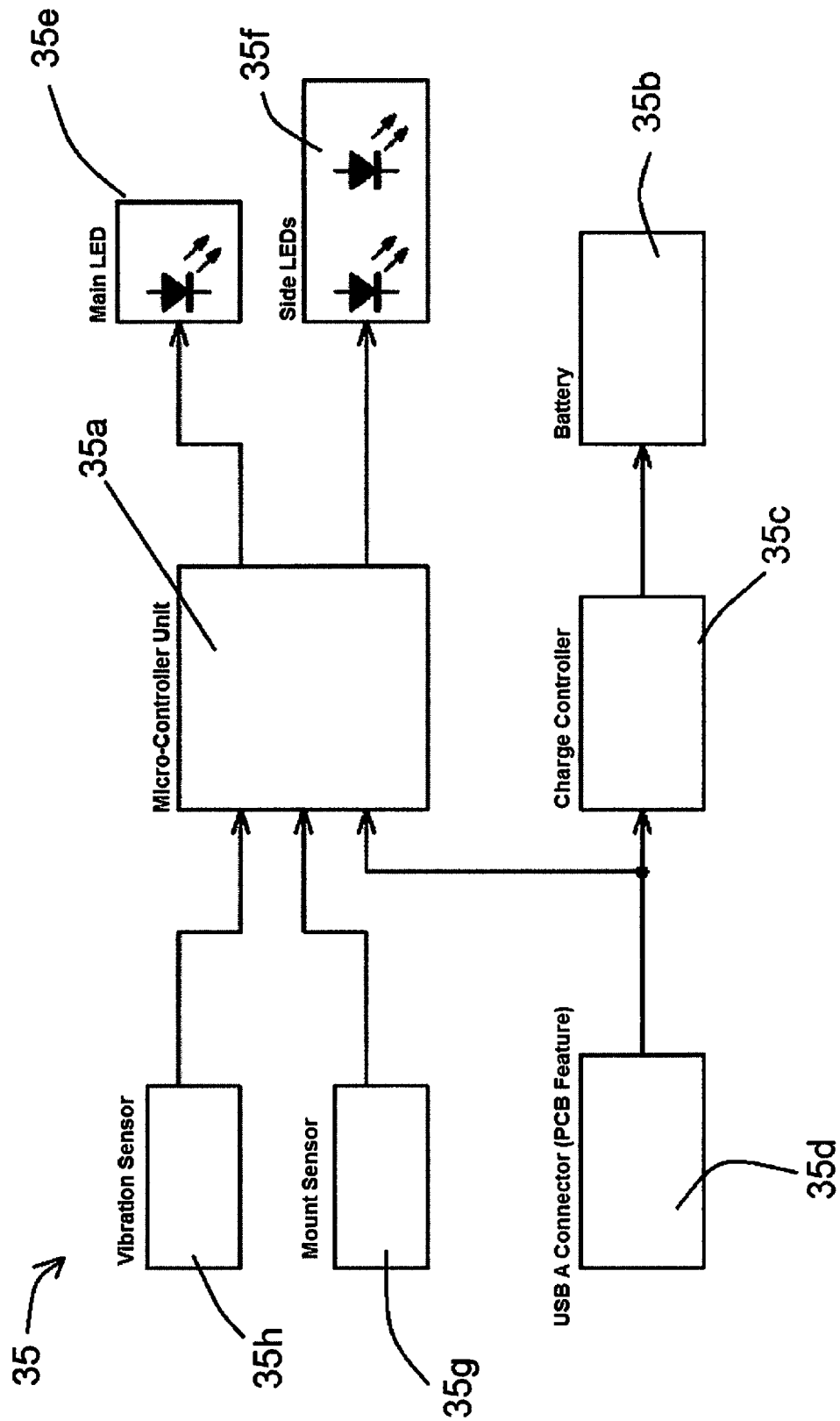
FIG. 6 is a simple overview schematic for the printed circuit board of the light assembly.

FIG. 6 is a simple schematic showing the basic circuit 35 of the light unit. The circuit includes a micro controller 35*a*, battery 35*b*, charge controller 35*c* and USB connector 35*d*. LEDs, main and side, are indicated at 35*e* and 35*f*. The circuit also includes a mount sensor switch 35*g* (sensing connection of the light unit to the base) feeding to the controller, and a vibration or motion sensor switch 35*h* feeding to the controller, to power the LEDs only when the light assembly is in motion.

Figure 5:
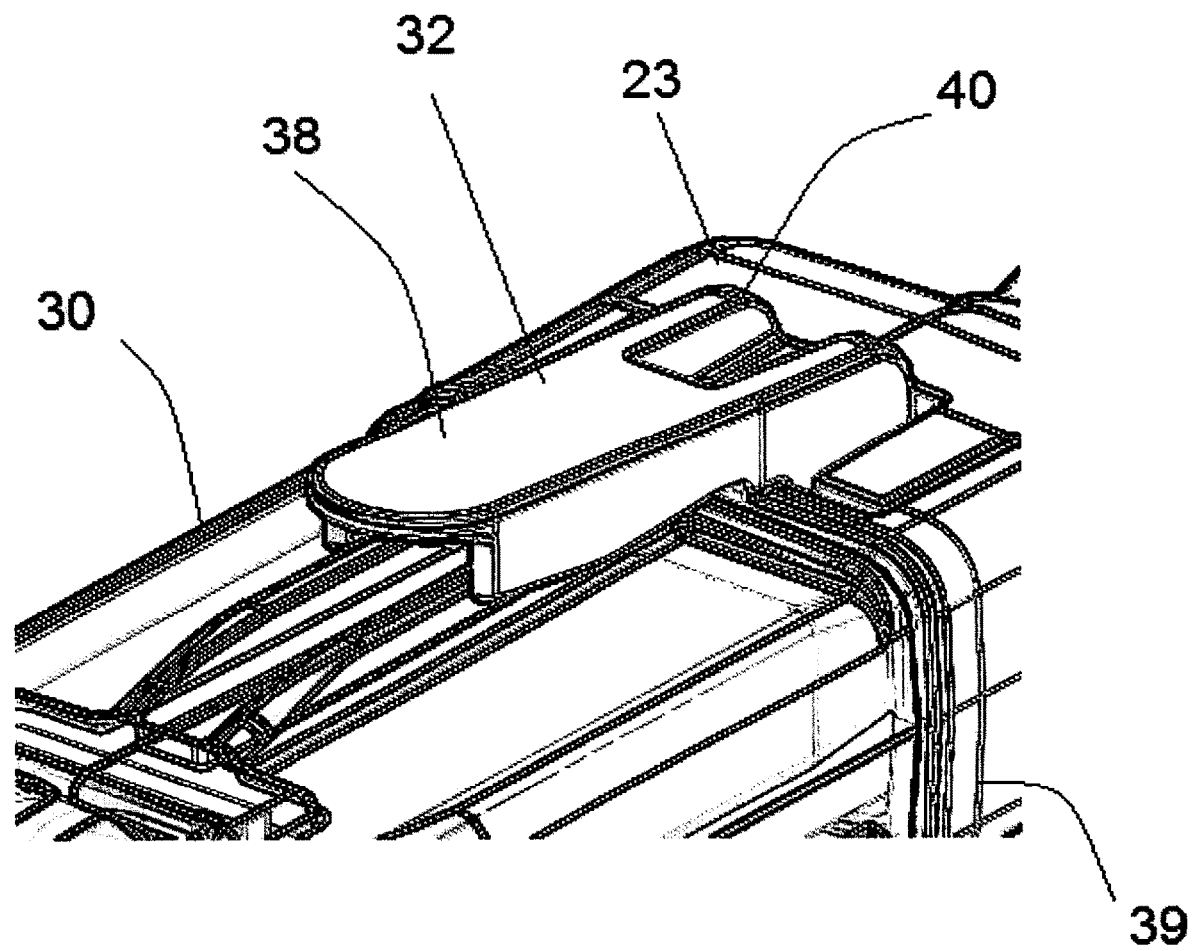
FIG. 5 is a partial view in perspective showing connection between the main light body and the base.

FIG. 5 is another detail view that shows the lever latch 32 acting to retain the units 30 and 23 together. The lever 32 is part of the main unit 30, being secured to the unit 30 preferably at a "plastic hinge" that allows rocking about a horizontal pivot axis. It is a thumb lever, pushed down at an end 38 to raise the opposite end 40, when the units are to be separated. This is better seen in FIG. 7, a cross section view that shows a compression spring 42 that can be included to bias the lever rotationally toward the latching position shown in FIG. 7. The plastic hinge is approximately at the locations 36 shown in FIG. 7. In the position shown, a ledge or hook 44 engages over a surface of the base unit 23. The lever latch can be part of a separate molded part 39 that is assembled onto a back end of the overmolded structure.

Figure 3:
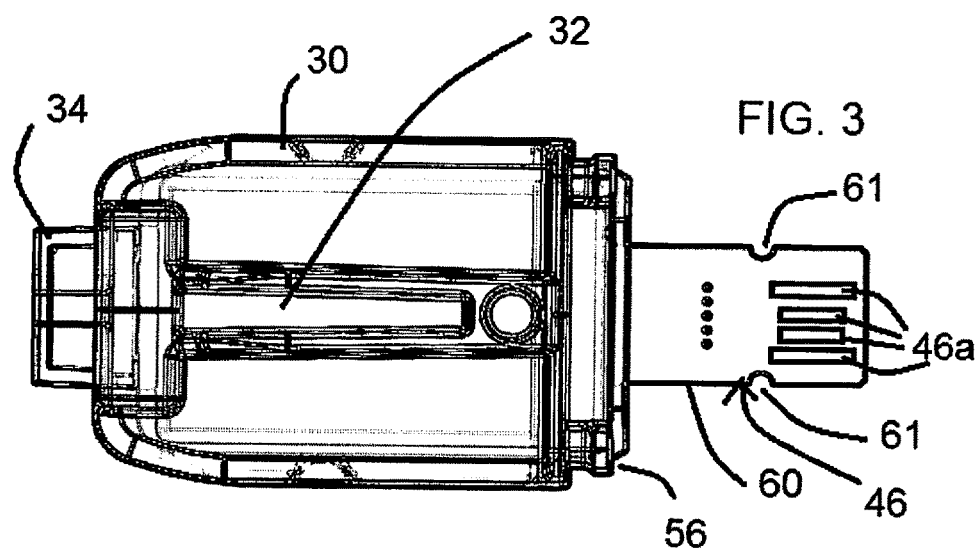
FIG. 3 shows in plan view a main light body of the assembly, with LEDs and internal electronics.
Figure 4:
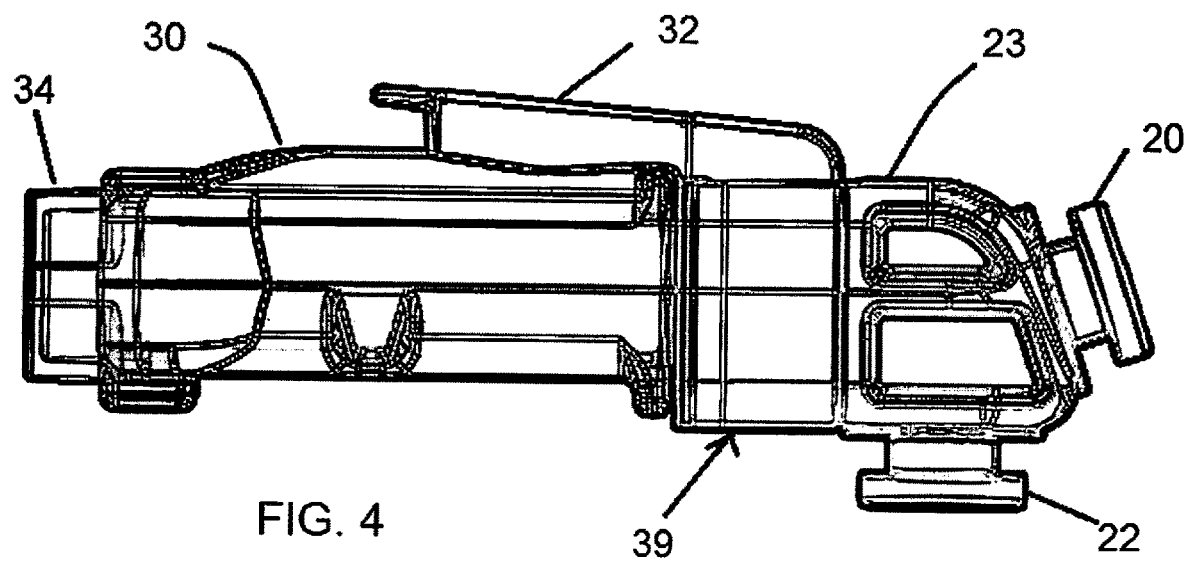
FIG. 4 is a side elevation view showing the light assembly including the base and the light body.
Figure 7:
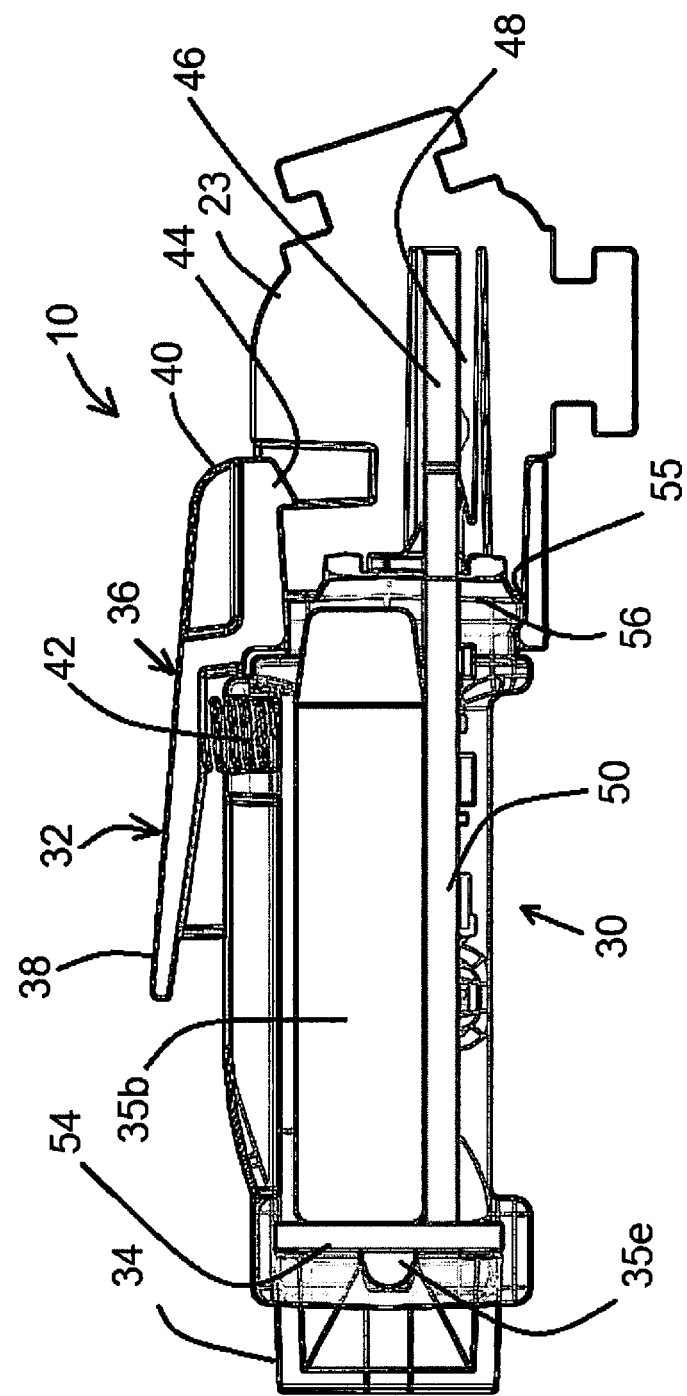
FIG. 7 is a sectional side elevation view showing the assembly, including the main light body and the base, with some internal components.

As shown in FIGS. 3, 4 and 7, the main LED unit 30 basically comprises a package of electronics including one or more LEDs, encapsulated in a plastic covering, except for an extending tongue comprising a USB blade 46 which slips into the slot 48 of the base unit 23 when the two are assembled. The electronics of the main unit 30 preferably are encapsulated by low-pressure overmolding as described above. Preferably all of the main LED light unit 30 is overmolded save the inside of the front optic 34 from which the light emerges and the outer connecting end of the extending blade 46. The low-pressure overmolding does not damage the electronics because of the low temperature and pressure, and even the battery is encapsulated along with the electronics (35*a* through 35*h* in FIG. 6, although the mount sensor 35*g* may not be encapsulated) and is not damaged because of the short time involved and the failure of the heat from the overmolding to penetrate through the battery. Low-pressure overmolding is explained at moldmansystems.com, wikipedia.org/wiki/low pressure molding, and at miracoinc.com/services-capabilities.

Note that electrical aspects of the blade 46 are indicated as 35*d* in FIG. 6.

The tongue with USB-configured blade 46 is effective to help secure the main unit 30 to the base 23, or as the sole means of locking the two units together, as in alternative forms described below. FIG. 7 shows that this blade 46 extends deeply into the slot 48 of the base unit 23. The tongue/USB blade 46 is integral with and an extension of the circuit board 50 supporting the electronics of the LED unit 30, as shown in FIG. 7. FIG. 7 also shows one or more LEDs 35*e* mounted on an LED board 54 connected to the main electronics board 50. The optic 34 is also seen in better detail in FIG. 7.

As noted above, the light unit 30 and base 23 are sealed together against moisture intrusion when connected. For this purpose an O-ring 55 can be positioned as shown in FIG. 7, between a surface 56 of the overmolded light unit 30 structure (to which the O-ring is attached) and an adjacent surface of the base unit 23.

In the sectional view of FIG. 7 the battery for the light is indicated at 35*b*, positioned against or in close proximity to the circuit board 50. As noted above, the battery, along with the circuit board and attached/embedded electronics, and the LED board 54 and LED 35*e*, and also the optic 34, are encapsulated by low-pressure, low-temperature overmolding. The overmold can extend from the sides of the optic 34 back to a point on the extending tongue/USB blade approximately at a location 60 (FIG. 3), and is in direct contact with all exterior surfaces of the circuit board and electronics, battery and LED, forming an integral encapsulation of all these components. The overmold itself forms a casing and the light body 30 is without any other housing, avoiding assembly of components into a housing. The molding at point 60 is back far enough to assure the blade can function to plug into a USB port for charging of the battery. USB contacts are shown at 46*a*.

As seen in FIG. 3, the extending USB blade 46 can have a pair of opposed recesses 61 in the sides of the blade, shown as semicircular indentations in the drawing. These recesses, in one embodiment of the invention, are gripped by elements (not shown in FIG. 3) in the base 23, for retention of the two components 30 and 23 together, which can be without the lever latch 32.

The light assembly 10 of the invention has several important benefits. By the low-pressure overmolding the main LED unit 30 is made in a very efficient way and is compact in design, since the housing is simply a plastic overmolding onto the components and requires no structure to hold components in place in a housing. The circuit board extends out as a tongue/USB blade that can secure the light unit 30 to the base unit 23, without any electric coupling made via the USB blade. The protruding USB is used for charging when the light unit is removed from the base, but no additional USB cap or waterproof casing is needed, since the blade, when the light device 10 is in operable configuration, is covered and sealed in a waterproof manner via the base unit 23. The base unit 23 allows the light device to be secured to a seat post as a tail light, or to the handlebar as a front light, or for other purposes such as a diving light. When the battery is to be recharged, the main LED unit 30 is simply removed from the base 23, pulling the USB blade 46 out so that it can be plugged into a charging power supply or to a computer or other USB-supporting device. For the light to be powered requires that the unit 30 be attached to the base unit 23 and that the light assembly (the bicycle) has not been immobile for more than a preset period, e.g. a few minutes. The light assembly thus needs no user-accessible switch.

Figure 10:
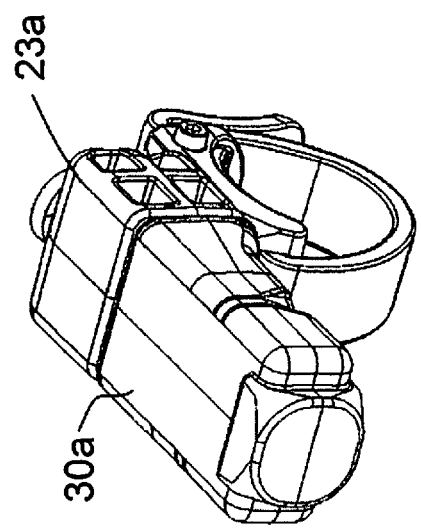
FIG. 10 is another perspective view, showing the main light unit fully rotated into locked position on the base unit.
Figure 8:
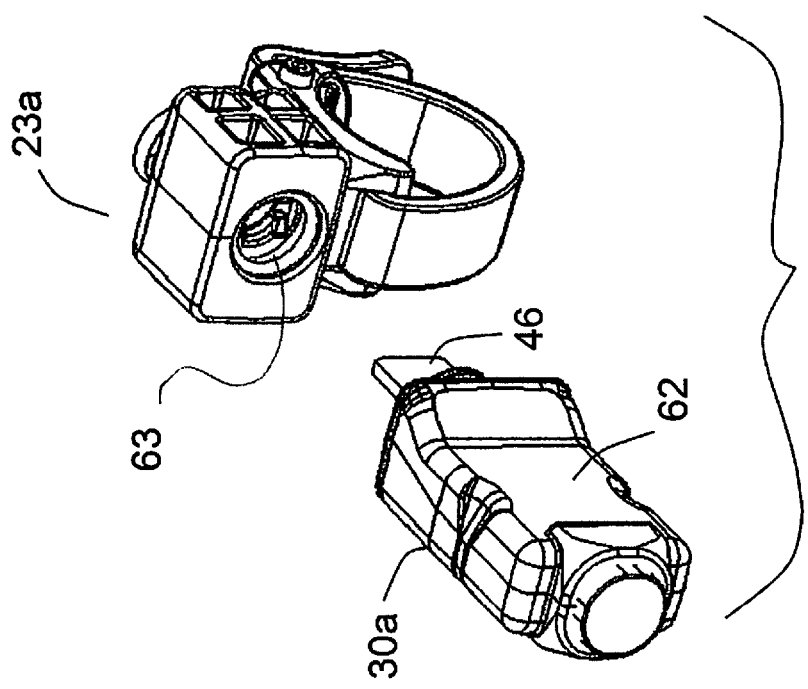
FIG. 8 is an exploded view in perspective showing another embodiment of the invention wherein the main light unit is latched to the base in a different way.

FIGS. 8 through 14 show another form of the bike light of the invention, with a different means of latching the light body to the base mounting unit. FIG. 8 shows the two components, the base unit 23a and the light body 30a, just before they are attached together. The PCB "tongue" or stick with blade 46 is shown at the back of the main light unit or body 30a. The unit 30a has a bottom 62 that is turned to the right, the light body 30a being oriented at 90° to the fully assembled position which is shown in FIG. 10. The base 23a has a receiving socket 63 into which the USB blade 46 will be inserted.

Figure 9:
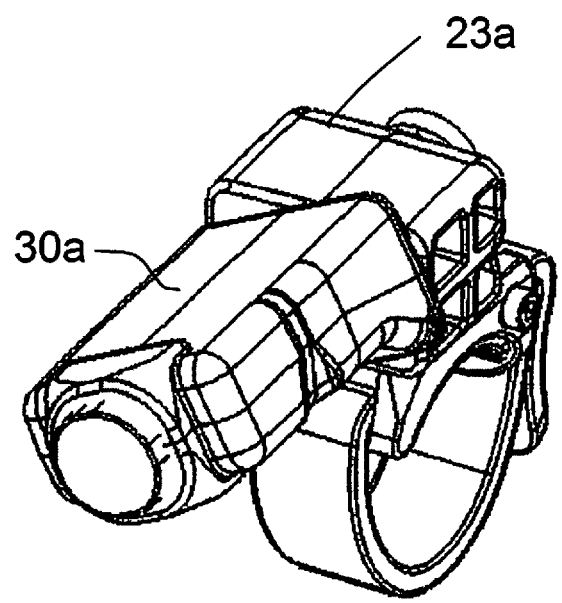
FIG. 9 is a perspective view showing the light unit inserted into a base unit and partially rotated.

FIG. 9 shows the light body 30a with its USB light inserted into the base 23a and partially rotated. In FIG. 10 the attachment is made and the two components are locked firmly in place, in sealed relationship.

FIG. 11 is a view showing the light body 30a with an O-ring seal 55 just forward of the USB tongue with blade 46, and showing the mounting base 23a into which the light body will be inserted. The O-ring is placed in a recess in the low pressure molding material extending from the main unit 30a. FIG. 12 shows the mounting base 23a and its receiving the socket 63 in better detail. Internal components are seen, including ¼ turn locking features 66 that interact with locking notches on the USB blade, the notches being shown at 68 and 69 in FIG. 11 (somewhat different from those depicted in FIG. 3), when the USB tongue is inserted into the socket 63 of the base, in the position shown in FIG. 8. It can be envisioned that with the notched tongue/USB blade 46 in the socket, the notches 68 and 69 engage with the features 66 and, when the housing body is rotated ¼ turn as explained above, the notches will lock onto those features and retain the two components 23a and 30a firmly together, with the O-ring 55 making a watertight seal. No external spring latch is needed in this embodiment.

Also seen in FIG. 12 is a switch finger 70 of the base unit 23a. This finger 70, fixed in position, engages with a switch button on the light body to close a power circuit in the light body as the light body is rotated fully into place on the mounting base. This button switch is not seen in detail in the drawings, but it is within the volume sealed by the O-ring 64 and is positioned on the USB tongue. In this way, as described above, the power circuit in the light body is enabled, but the light will not be powered until the motion detector on the circuit board activates the light.

Figure 13:
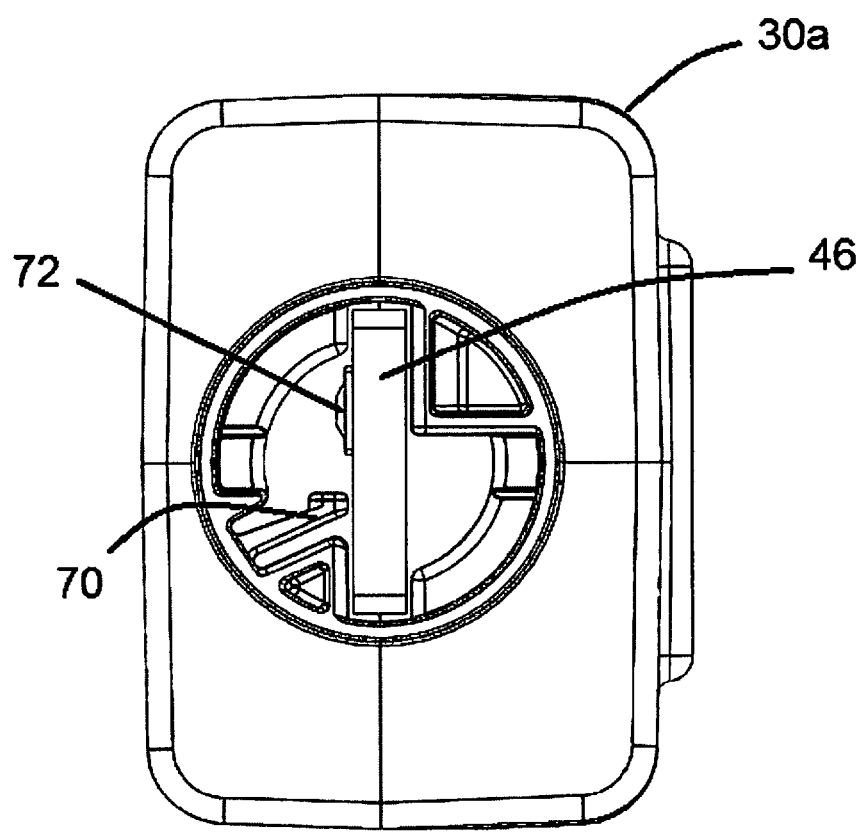
FIG. 13 is a cut away drawing showing the PCB blade with exposed USB contacts located in the mounting base.
Figure 14:
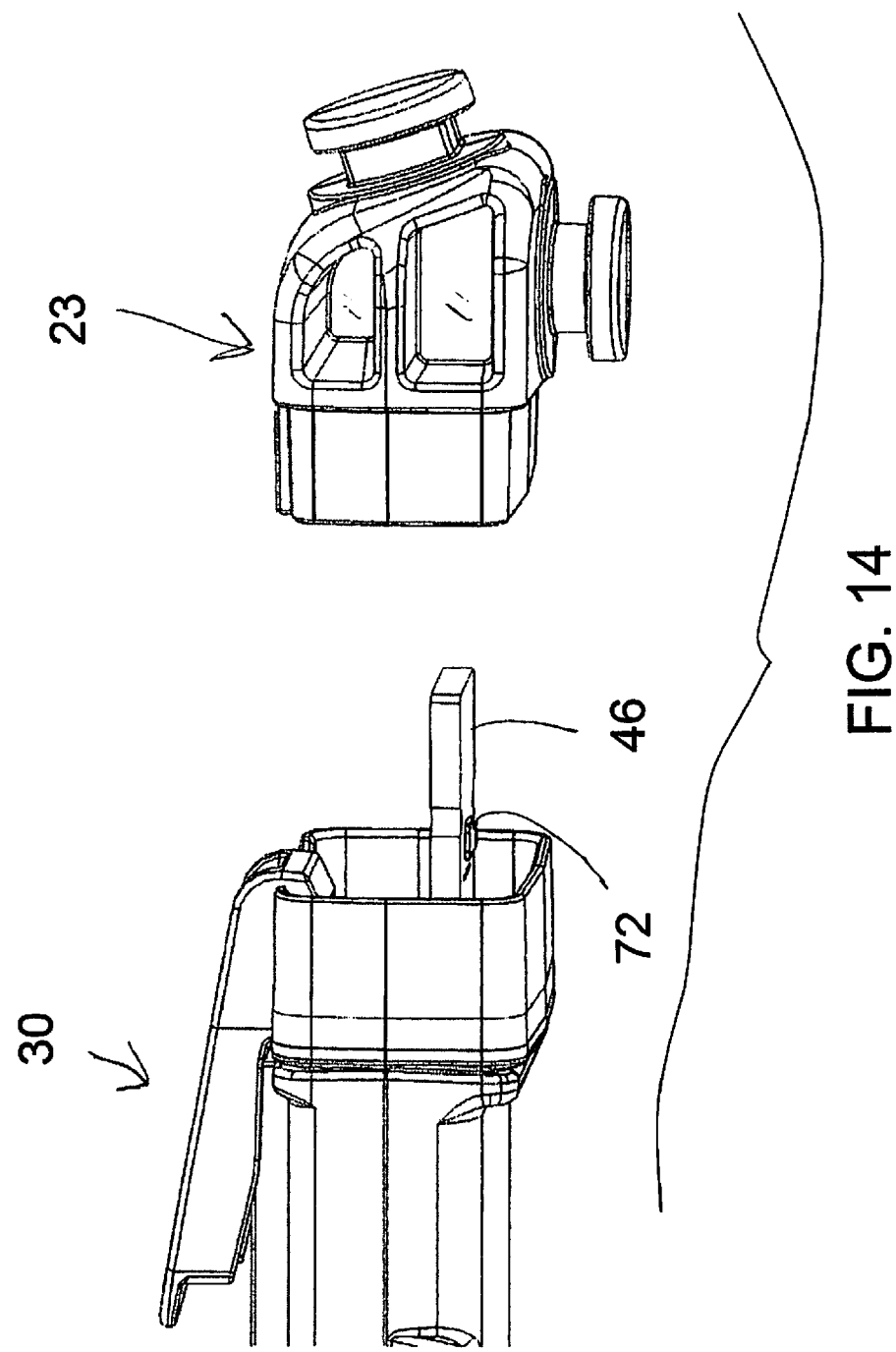
FIG. 14 is an exploded view in perspective showing another latch version for the light device of the invention.

FIGS. 13 and 14 are further views showing the switching feature that acts when the two units are coupled together. In FIG. 13 the rear end of the light body 30a is shown, with the protruding USB blade or tongue 46. The drawing also shows some of the mounting features that are in the base unit 23a, including the stationary switching finger 70. The view of FIG. 13 assumes the two units have been pushed together but the light body 30a has not yet been rotated. When the light body 30a is rotated, which will be counterclockwise as seen in FIG. 13 (clockwise as seen in FIG. 8), the light body's spring button switch, shown at 72 and mounted on the tongue portion of the circuit board, will move left/downwardly and into contact with the switching finger 70, closing the power circuit. The switching finger 70, being part of the base mounting unit 23a, will remain in the position shown.

In FIG. 14 a switching arrangement is illustrated for the first-described embodiment, for activating main power to the light body 30 when coupled to the mounting base 23. The units 30 and 23 are in the form shown in FIGS. 1 through 7, but the switch being described here could be used with other latching configurations.

Figure 15:
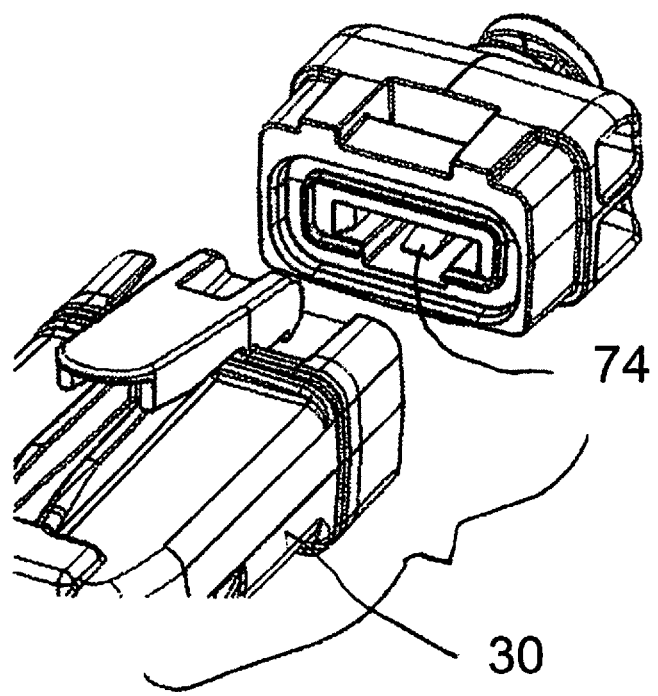
FIG. 15 is an exploded partial view in perspective showing the features of FIG. 14.

The USB tongue 46 extends out the back of the light body 30, and has, as part of the circuit board and at the base region of the USB tongue, a button switch 72 (spring-biased momentary switch) such as shown in the embodiment illustrated in FIG. 13. When the light body is connected to the base 23, as indicated in FIG. 15, the button switch 72 will engage down against a switching finger 74, which will depress and close the switch.

In another form and application of the invention, the light unit or light body 30 is an underwater light. As explained above, the overmolded construction, directly over the LED (s), electronics and battery, lends itself efficiently to waterproofing the light unit. In the case of an underwater light, the light body 30 is inserted into a handle or wrist-worn base with a mounting device, or it can be secured to a diving helmet or mask or into a base that is part of an underwater camera housing. When attached into the base, everything in the light unit 30, including the extending tongue with USB blade, is isolated from the water environment. In one implementation, similar to what is described above, the tongue is pushed into the base in one rotational position, then rotated to lock it into place on the base. In the case of the UW version, there can be two different rotational positions, in addition to the position of insertion. For example, rotating the light body by 45° after insertion can simply secure the two units together in a waterproof connection. Full rotation to the 90° position is then effective to provide power to the light, via tripping a momentary switch as described above.

It should be understood that the invention can be made in an alternative form in which the extending USB blade actually brings power to the light unit 30, which would be without a battery. In that case the base can carry power, either with a battery or receiving power from a remote battery, as on a bicycle or bicycle helmet. The light unit can be removed for security, or to plug it in elsewhere.

Figure 16:
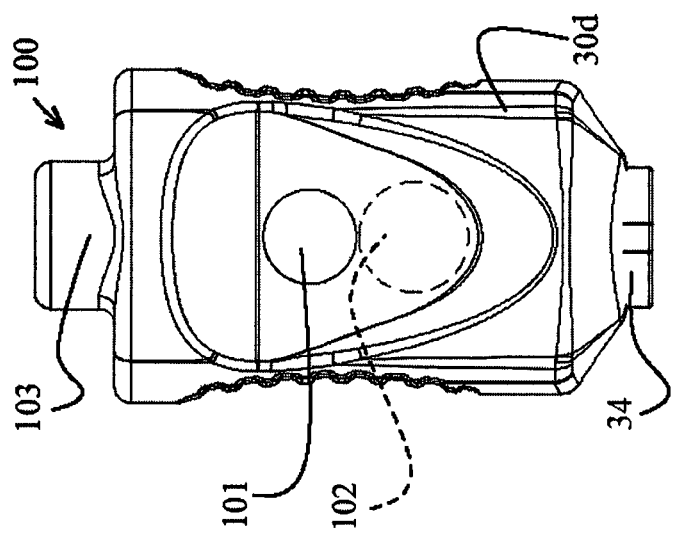
FIG. 16 is a plan view showing another embodiment of a compact LED light of the invention, without an extending USB blade.

FIG. 16 shows in plan view another embodiment of a compact LED light device 100, a simpler form of the invention not including an extending USB blade. The unit includes a light body 30d formed as in the embodiments described above, with low pressure overmolding directly onto the electronic components, and preferably without any penetrations of the overmolded casing, although an appropriate form of connector device (rod, threaded rod, chip, socket, etc.) can extend out the back or a side of the housing if desired, to enable attachment to another structure, which could be a bike, a tool, a helmet, head band, book, table, etc. The light unit can include a front optic 34 as in the previous embodiments, preferably all overmolded with a clear plastic, forming a completely waterproof unit 100. It can be without an optic if acting simply as a marker light or for broad illumination. The unit 100 in a preferred embodiment is without external contacts, and charging of the internal battery can be performed inductively (although another embodiment can have extending contacts for charging). Inductive chargers are well known and becoming common for cell phones and other portable electronic devices. Further, the unit 100 preferably has no protruding external switch, but power from the battery can be switched on in response to motion or vibration of the unit 100. For example, a motion/vibration sensor within the unit (not shown in FIG. 16) can connect power to the LED whenever motion of the unit is detected, with power to be maintained until the unit experiences no motion for more than a preset period of time, as in an embodiment described above. In this embodiment no other condition than the motion preferably is required, as opposed to the embodiment above wherein that unit was required to be attached to another device before power could be activated. However, if desired, a surface switch can be formed integral with the overmolded casing. That is, a small section of the casing, preferably round as at 101, can be somewhat flexible so as to operate an on/off main switch within the unit when pressed. The unit's sealed integrity is not affected.

In this form of the invention the light unit 100, as in the earlier described embodiment, has a casing or body 30d formed entirely by low pressure overmolding, with the overmolding material being in direct contact with internal components such as the battery, a microcontroller/printed circuit board, charging equipment, etc., holding the components firmly in place. It is preferred, but not necessarily required, that the overmold material also cover the LED and optic 34, provided the overmold material is clear and transparent.

Figure 17A:
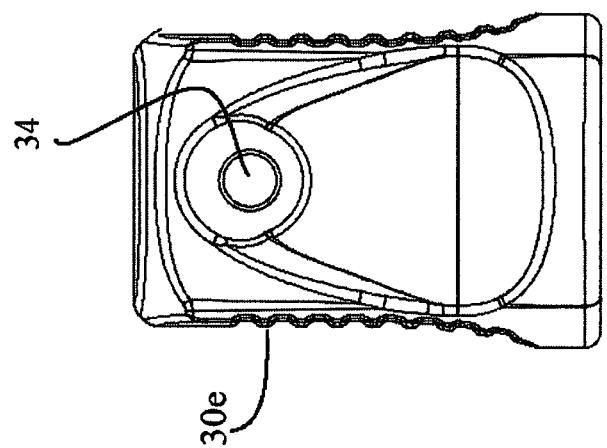
FIGS. 17 and 17A are perspective views showing two embodiments of the invention.
Figure 17:
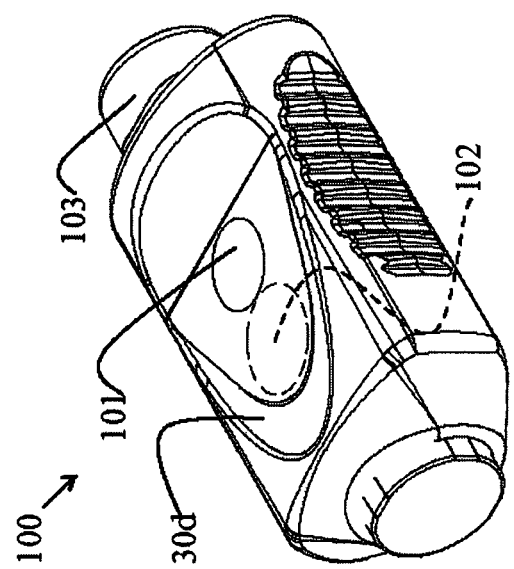

FIG. 17 shows the light unit 100 in perspective. FIGS. 16 and 17 show the optional switch 101 and also a photo sensor 102 (dashed lines), or a window area for an internal photo sensor, for detecting daylight so that the unit will not be turned on via the motion detector when ambient light is bright. Also illustrated is an optional mount 103, a shaped end integrally molded on the unit to allow it to be gripped by a bracket or other holding device on an implement, tool, bicycle, helmet, shoe, or anything else to which the unit is to be attached. Preferably this will provide for quick removal, for charging or for periods of nonuse. It can be in any shape desired.

FIG. 17A shows a variation in which the light body 30e is small and flat, with the LED or optic 34 for the LED on a relatively flat side of the light body. In this embodiment the unit can include a magnet at a back side, covered by the overmolding, for quick attachment/detachment on an object having metal. The battery in this form of light can be essentially rectangular, or it could be disc shaped. The device could be held on a bike rider's shoe, for example.

Figure 18:
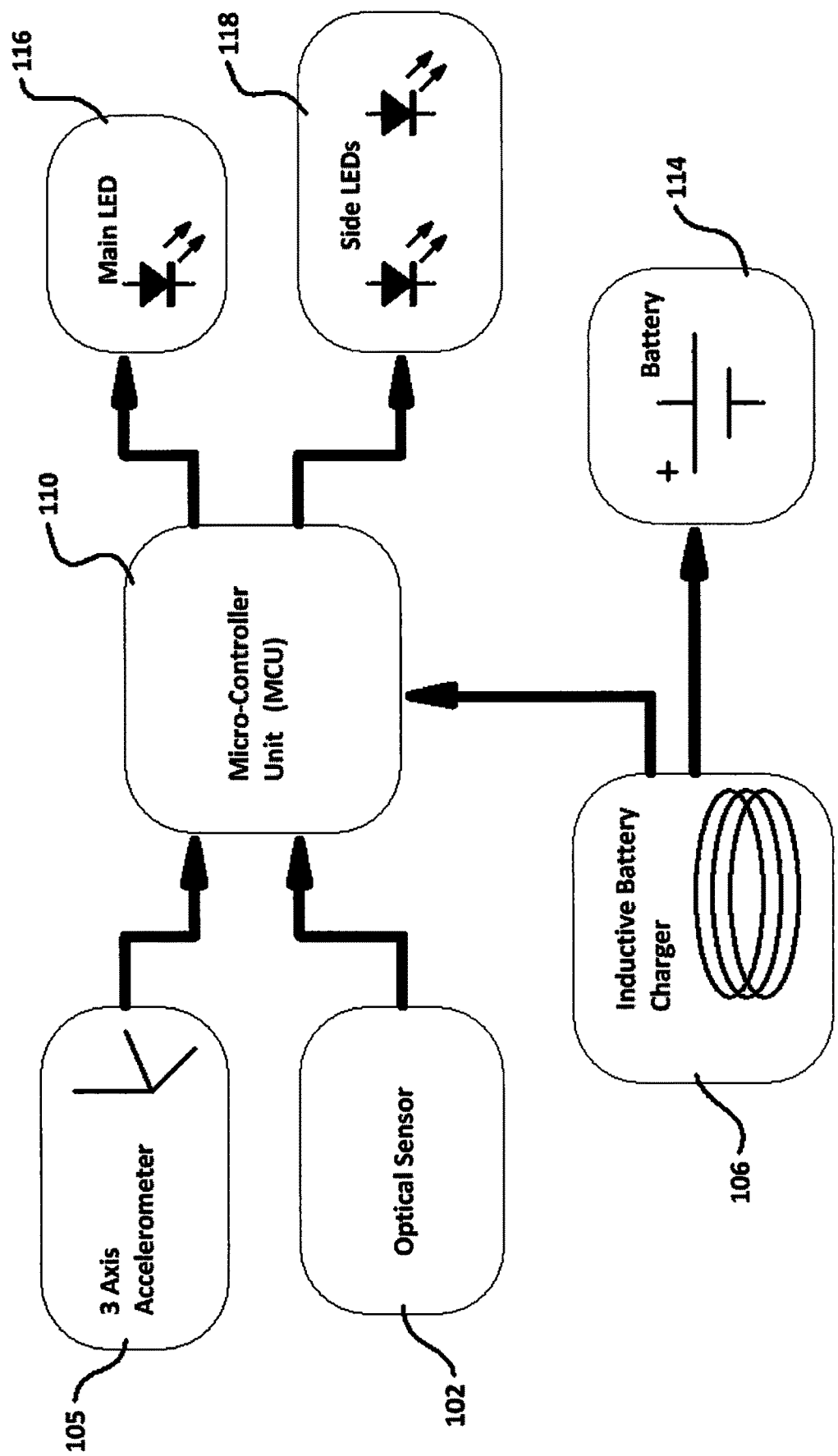
FIG. 18 is a simple overview schematic for a printed circuit board of the light assembly of FIG. 16.

FIG. 18 is a simple schematic indicating primary components contained within the light unit body 30d in a preferred embodiment. The schematic is similar to that of FIG. 6, but with some differences. The electronics 104 within the unit include a vibration sensor or motion sensor 105, shown as a three-axis accelerometer, and an inductive battery charging unit 106. In one embodiment the circuitry can include an optical sensor, i.e. ambient light sensor 102 as noted above, to provide a second condition for powering the light: ambient light surrounding the device must be low enough as to require illumination. This preset level light could be different for different applications, such as a bicycle light, which may be needed only at night, as opposed to a work light to provide additional illumination for close detail work, even though ambient light might be relatively high. In such a light design for close work, the ambient light sensor could be omitted, with the motion sensor alone being effective to activate the light.

FIG. 18 also shows a microcontroller unit 110 and a rechargeable battery 114. All of these components, other than the battery, can be formed directly on a PC board. The battery, which can be as described above, is connected to the electronics and can be physically attached to the PC board. The inductive charging unit 106 includes a charge controller.

A main LED is indicated at 116, and, in the case of a bicycle light, optional side LEDs 118 can be included if desired.

The controller unit 110 receives a signal from the motion/vibration sensor 105, and if ambient light is below the preset level as signaled by the sensor 102, or if the sensor 102 is not included, the controller will connect the LED 116 to receive power from the battery 114. When the battery requires charging, the light unit 100 is simply placed against or adjacent to an inductive charger which, via an electric field in a charging pad, induces a current in a loop of wire in the light unit (at 106), the current being used to charge the battery. The controller unit 110 preferably includes a timer, so that power is switched off if motion is not detected for a preset period of time, such as a few minutes. An LED indicator can be provided to indicate low battery charge.

Figure 19:
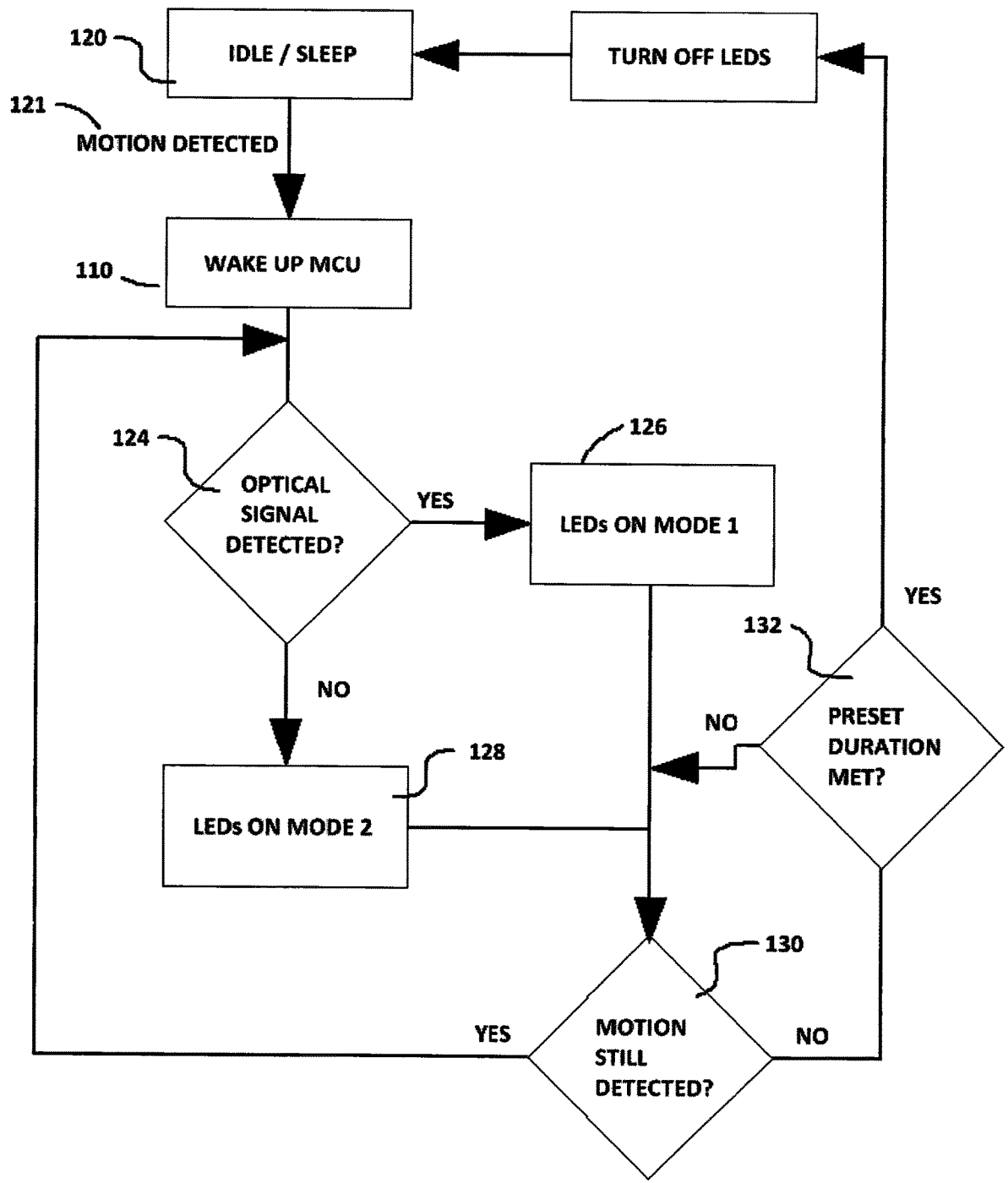
FIG. 19 is a basic flow chart indicating the functions and operation of the light unit of FIGS. 16-18.

FIG. 19 is a flow chart to outline basic functions. At 120 the unit is idle, in sleep mode, and on a motion of the unit, as noted at 121, a signal is sent to the microprocessor 110. This "wakes up" the controller and, if the optical signal detects low light (e.g. darkness), as at the decision block 124, the LED is powered and projects light from the unit. FIG. 19 is directed primarily to a bicycle light, wherein night time use will require a steady beam, but a flashing light might be desired in daytime use. Thus, from the decision block 124, if darkness is detected the LED or LEDs are operated on "mode 1", meaning a constant beam, as noted in the block 126. The block 130 shows that the continued existence of motion is required to continue operation of the light, and if no motion is detected for a prescribed duration, as at the decision block 132, the LEDs will be shut off. If motion continues ("yes" at 130), ambient light level is checked (124), and the light mode will change if ambient light changes and the darkness (or low light) signal is no longer detected. Thus, LED "mode 2", as noted in the block 128, becomes active if the optical signal is not detected, ambient light being higher than a threshold such that, in the case of a bicycle light, only a flashing mode will be needed as at 128.

As noted above, the light unit, via the microcontroller, can have a time out feature as described above, whereby power is turned off and the unit returns to sleep mode if no motion is detected (decision block 132) within a preselected duration of time.

Figure 20:
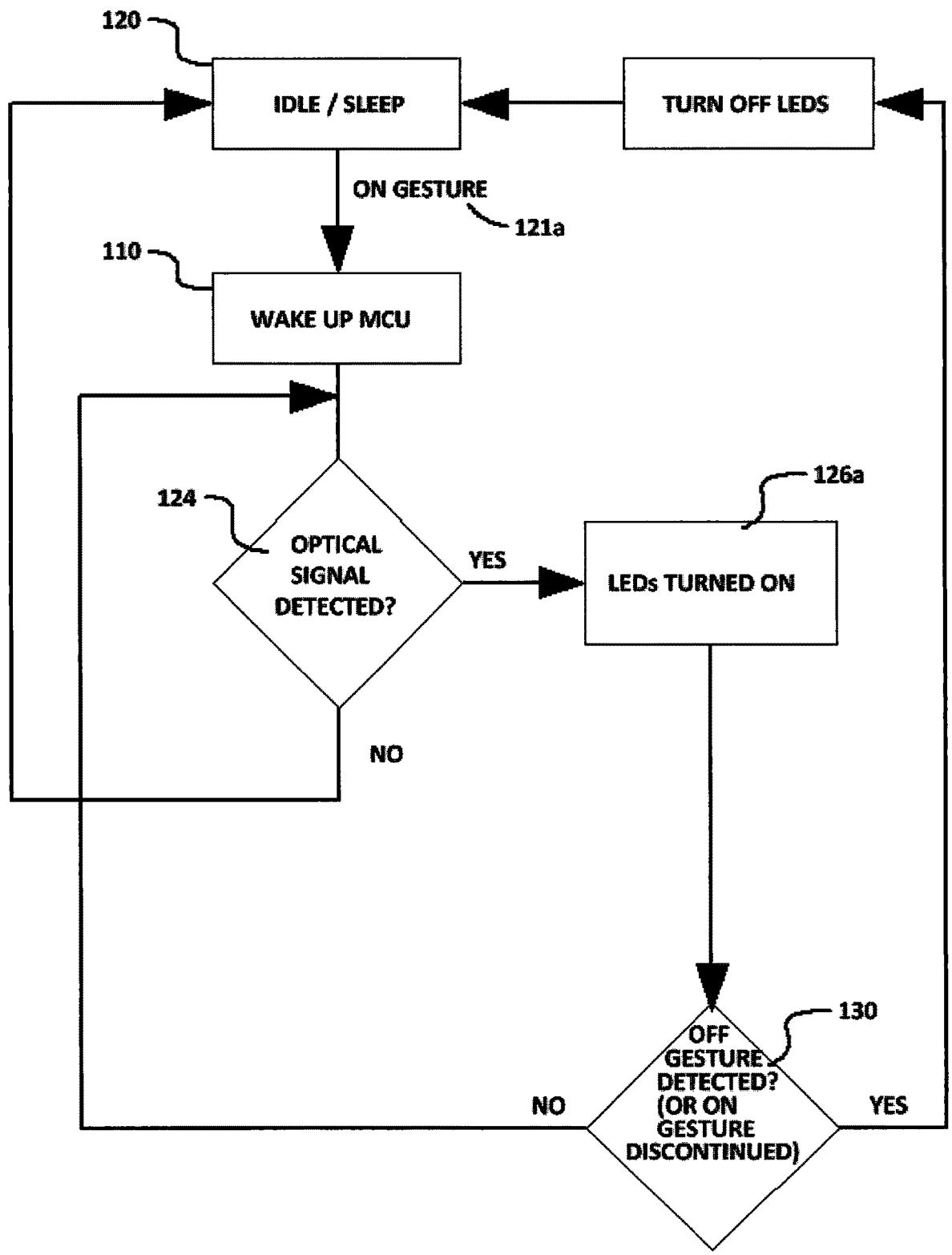
FIG. 20 is another basic flow chart with some variations.

FIG. 20 is a flow chart for procedure of a light unit of the invention, generally for non-bike light applications. This is an illustration of a system of operation in which a specific gesture of the user is effective to turn the light unit on, and the same gesture, or a different specific gesture, can be used to turn the unit off. Such specific gestures, involving specific, deliberate motions in any or all of X, Y and Z directions, can be useful when the light is for purposes other than a bicycle front or tail light. Some of these are discussed further below, but as an example, if the light is used on a hand tool, the accelerometer/microcontroller might require certain specified hand movement (back and forth, circular, zig zag, etc.) as an on gesture, and the same or a different specific movement as an off gesture. In the flow chart of FIG. 20 the initial steps are similar to those described for FIG. 19, except that an "on" gesture 121a is used to wake up the microcontroller. The decision block 124 concerning ambient light is similar to that of FIG. 19. Here, however, the LEDs are not shown with "mode 1" and "mode 2", because it is not a bicycle light and a flashing mode would not ordinarily be needed. However, the light could have two different modes if desired, such as a high-power beam and a low-power beam, which could be selected at the decision block 124 depending on ambient light, as in the previously described chart of FIG. 19. FIG. 20 simply indicates that the LED is turned on at given ambient light conditions (block 126a), and that if ambient conditions are not as prescribed, the unit will return to sleep mode, without turning on the LED. Note that this feature of inoperation due to lighting conditions could frustrate the intentions of one who makes a deliberate hand gesture to turn the unit on. In that case the decision block 124 might be eliminated. It is useful, however, if the initiating gesture is something like the motion of a foot (to which the light is attached) in pedaling a bike, which motion can act as a "gesture" that turns the unit on.

FIG. 20 shows a decision block 130, querying whether an off gesture is detected. As an alternative, this could simply be a discontinuance of an ongoing "on" gesture, as noted, in a case such as the shoe on the bicycle pedal. The light will go off after a preset delay; when the bike rider is not pedaling (as on a downhill), the light will remain on for that preset period. In that case it is also possible to have a specific "off" gesture of the foot—as unusual movement. Normally a bike rider will want the light unit switched off when the rider leaves the bike. FIG. 19 can represent the operation of the light on a biker rider's shoe, with "motion" meaning the specific pedaling motion.

LED light devices according to the invention are versatile, having many applications beyond bicycle front and rear lights. The light unit is small in size and can be, for example, in a disk shape as in FIG. 17A with a diameter of less than an inch, even less than 7/8 inch, and a depth of 1/4 inch to 3/8 inch. Miniaturization is limited primarily by desired brightness level and battery charge duration. As one example, a small version of the LED light of the invention can have a single LED and a small battery, in a low-pressure overmolded casing and with a magnet attached to or embedded in one side or end. The magnet provides for attachment to anything with ferrous metal, which could include the shoes of a runner or bike rider fitted with a small metal strip or plate at the back side of the shoe (VELCRO could be used rather than a magnet). The light can be used as a safety marker light for the runner or rider, with a flashing (or steady) light output to reveal the position of the runner or rider. In either case, a gesture for switching on the light could be the circular cadence of the shoes as the bike is pedaled, as described above, or the distinctive movement pattern of a runner's feet.

The light of the invention can also be used on drones, such as on small consumer drones. The light, in any frequency/color, could be used to show the position of the drone at night (or a flashing light could be used in daytime), or to illuminate some elevated object where the drone hovers, including for supporting photography. It could be attached by VELCRO, by zip ties, magnet or other means. Further, the light could have an infrared LED to be used in combination with a drone to trace and follow the movement of an object. For example, a small infrared-producing light unit of the invention could be attached to the underside of a car or truck, as by magnetic attachment or VELCRO or other means, acting as a stealth device producing infrared light reflected off the pavement, and detected by a drone with an infrared light sensor, flying above. In that way the movements of the vehicle can be followed and the positions and movement reported by the drone. Similarly, the infrared device could be attached on a bicycle (by the owner) so that an infrared-sensing drone can follow the bicycle from above, producing a photo or video record of the bicycle ride as desired by the rider.

Many other uses are possible. Examples are marker light for a bicycle helmet, a headband light for illumination of work or for navigating in the dark, a camping light for various purposes, and a book reading light. Some of these applications will require an optical element for focusing or narrowing somewhat the beam from the LED, and other purposes will not, such as with the unit functioning as a marker light.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:
1. A light projecting device, comprising:
an LED light unit, the light unit including an LED, a printed circuit board with electronics including an LED driver driving the LED, and a rechargeable battery connected to the printed circuit board,
the LED light unit comprising the printed circuit board, battery and LED encapsulated in a low-pressure overmolding, through the length of the LED light unit, with molding material in direct contact with and encapsulating the circuit board, battery and at least part of the LED to form an integral casing, which is a sole casing of the LED light unit, whereby the LED light unit is completely waterproof,
a switch for connecting the LED to power from the battery, the switch being wholly internal and activated by an internal switching device comprising one of: a motion sensor, a proximity sensor, a gesture sensor, a moisture sensor, an RF sensor, a magnetic field sensor, and an internal switching device responsive to external force on a prescribed part of the overmolding, and
means for recharging the battery.
2. The light projecting device of claim 1, wherein the internal switching device comprises a motion detector.
3. The light projecting device of claim 1, wherein the internal switching device comprises a gesture sensor responsive to a particular pattern of movement.

4. The light projecting device of claim 1, wherein the means for recharging comprises an inductive charging unit inside the casing, effective to charge the battery when the casing is placed adjacent to an inductive charger.

5. The light projecting device of claim 1, wherein the means for recharging comprises charging contacts exposed at the casing's exterior.

6. The light projecting device of claim 1, further including an optical detector in the casing for sensing light level outside the casing such that the LED cannot be connected to power unless outside light is below the preset level.

7. The light projecting device of claim 1, wherein the LED driver includes two modes for driving the LED, a continuous and a flashing mode, and wherein an optical detector in the casing for sensing light level outside the casing such that with outside light below a preset level the LED is driven in a continuous illumination mode, whereas if outside light level is above the preset threshold, the LED is driven in a flashing mode.

8. The light projecting device of claim 1, wherein the low-pressure overmolding includes an exterior shaped feature providing for attachment to a bracket or gripping device.

9. A light projecting device, comprising:
an LED light unit, the light unit including an LED, a printed circuit board with electronics including an LED driver driving the LED, and a rechargeable battery connected to the printed circuit board,
the LED light unit comprising the printed circuit board, battery and LED encapsulated in a low-pressure overmolding, through the length of the LED light unit, with molding material in direct contact with and encapsulating the circuit board, battery and LED to form an integral casing, which is a sole casing of the LED light unit, whereby the LED light unit is completely waterproof,
a motion detector switch contained within the light unit for connecting the LED to power from the battery, such that the LED is powered by the battery when the light unit has been moved, and means for recharging the battery.

10. The light projecting device of claim 9, wherein the means for recharging comprises an inductive charging unit inside the casing, effective to charge the battery when the casing is placed adjacent to an inductive charger.

11. A light projecting device, comprising:
an LED light unit, the light unit including an LED, a printed circuit board with electronics including an LED driver driving the LED, and, at one end of the printed circuit board, an extending tongue comprising a USB blade configured to be inserted into and closely fit into a USB port, the USB blade having conductors positioned to receive power when the blade is inserted into a powered USB port,
the LED light unit comprising the printed circuit board and LED and, including the printed circuit board, the LED and a portion of the USB blade being encapsulated in a low-pressure overmolding, through the length of the LED light unit, with molding material in direct contact with and encapsulating the circuit board, LED and part of the USB blade to form an integral casing, which is a sole casing of the LED light unit, whereby the LED light unit is completely waterproof,
whereby the LED light unit can be plugged into a powered USB port to supply power to illuminate the LED, and the LED light unit can be supported and retained in a separate device or base via the USB blade in such a powered USB port of the separate device.

12. The light projecting device of claim 11, further including a switch for controlling power to the LED, the switch being wholly internal and activated by an internal switching device comprising one of: a motion sensor, a proximity sensor, a gesture sensor, a moisture sensor, an RF sensor, a magnetic field sensor, and an internal switching device responsive to external force on a prescribed part of the overmolding.

13. A bicycle light, comprising:
a base unit with a mounting device for connection to a part of a bicycle, the mounting device not being a part of a bicycle, the base unit defining a case or shell,
an LED light unit insertable into the case or shell, the light unit including an LED, a printed circuit board including an LED driver driving the LED, a rechargeable battery connected to the printed circuit board and, at one end the printed circuit board including an extending tongue comprising a USB blade configured to be inserted into and to closely fit into a USB charging port or into a receiving slot, the USB blade having conductors positioned to receive charging power when the blade is inserted into a powered USB charging port, and
the base unit having a receiving slot extending interiorly and of size to receive the light unit by sliding the tongue with the USB blade of the light unit into the receiving slot to grip the USB blade and fully enclose the USB blade within the base unit, the receiving slot being without power contacts and configured for retention of the light unit to the base unit.

* * * * *